March 1, 1932.  C. H. PARSONS  1,847,223
METHOD OF PREPARING A MEAT CHEESE LOAF
Filed Aug. 29, 1929
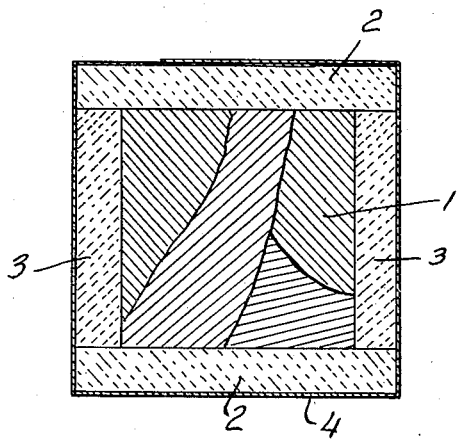
Clinton H Parsons
INVENTOR
Pennie Davis Marvin Edmonds
BY
ATTORNEYS Patented Mar. 1, 1932

1,847,223

UNITED STATES PATENT OFFICE

CLINTON HENRY PARSONS, OF CHICAGO, ILLINOIS, ASSIGNOR TO SWIFT & COMPANY, OF CHICAGO, ILLINOIS, A CORPORATION OF ILLINOIS

METHOD OF PREPARING A MEAT CHEESE LOAF

Application filed August 29, 1929. Serial No. 389,114.

This invention relates to an improved method of making meat-cheese loaf products such as set forth in my prior Patent No. 1,721,406 granted July 16, 1929, such products comprising cooked meat surrounded by an adhering layer of cheese and with the cheese enclosed by an adhering layer of tin-foil.

The method of making the new meat-cheese loaf set forth in my prior patent comprises embodying cooked meat in hot cheese emulsion which adheres to the meat and enclosing the hot cheese in tin-foil which adheres to the cheese. The amalgamation of the cheese with the cooked meat requires that the cheese shall be at a sufficient relatively high temperature so as to destroy surface bacteria of the meat and so as to heat the outer layer of meat to such a temperature as to bring about the amalgamation of the cheese with the meat in such a manner that the cheese clings or adheres to and becomes part of the meat.

The present invention provides an improved process in which the new meat-cheese loaf of my prior patent can be produced without heating the cheese to such a high temperature before bringing it into contact with the meat, and in which adherence of the cheese and meat and sterilization of the meat surface is nevertheless insured.

According to the present invention I form a loaf of the cooked meat and enclose it with a layer of cheese which in turn is enclosed by tin-foil, and I then heat the resulting product in an oven to insure perfect amalgamation of the cheese and meat.

When meat is enclosed in hot emulsified cheese and the cheese is not at a sufficiently high temperature to heat the meat surface and destroy surface bacteria and effect amalgamation, the resulting loaf when sliced in slices of around 1/16th to 1/8th inch thickness, separates where the cheese and meat come together. But if such a loaf when freshly produced is transferred to an oven having a temperature around 180 to 220° F. and reheated, both the cheese film and the surface of the meat are heated and perfect amalgamation of the cheese and meat can be effected. As a result, the meat-cheese loaf produced has the cheese and meat adhering together so that it can be sliced without the cheese coming loose from the meat.

The improved process of the present invention can be carried out with molten emulsified cheese in accordance with the general procedure of my prior patent, but with the cheese at a lower temperature so it does not sufficiently adhere to the meat or destroy surface bacteria; and the resulting loaf can then be heated in an oven with resulting heating of the outer cheese layer and of the surface of the meat in contact therewith, to insure commercial sterilization of the surface of the meat and amalgamation and adherence of the cheese and meat where they come in contact.

The improved process of the present invention can, moreover, be carried out without the preliminary melting of the cheese, and with the use of the cheese in the form of slabs which are cut to the proper shape and size to enclose the meat loaf. The block or loaf of meat can first be prepared in cooked and compressed form, and such block or loaf can then be placed in a mold lined with tin-foil and with slices of cheese inside the tin-foil and surrounding the meat. A top slab of cheese can be placed on top of the meat, and the tin-foil folded over the top. The resulting product can then be transferred to an oven and heated there for the purpose of amalgamating the cheese with the meat. The time of heating will vary somewhat with the thickness of the cheese slabs, and the temperature of the oven, but it should be sufficient to cause amalgamation and adherence of the meat and cheese and sterilization of the meat surface in case it has surface bacteria.

The slabs of cheese used in the new process may be either pasteurized or unpasteurized cheese since the heating of the cheese to amalgamate it with the meat will effect pasteurization. Moreover, the heating and melting of the cheese slabs will cause the cheese to run together and penetrate any unevenness in the surface of the meat so that the finished loaf will have the meat entirely surrounded by a continuous layer of cheese. The resulting product will be such a product as set forth in my prior patent with a central meat portion enclosed in an adhering layer of cheese, which, in turn, is enclosed in an adhering layer of tin-foil.

The attached drawing shows in cross-section a block or loaf of meat 1 surrounded by slabs 2 and 3 of cheese and with the whole wrapped in tin-foil 4. Such a loaf is ready to be put in a metal mold and transferred to an oven for the purpose of melting the cheese and amalgamating it with the meat. The cheese slabs may be, for example, ¼th inch to ½ inch in thickness. The meat should be cooked and sterile from a commercial standpoint except for the surface layer which may have become contaminated but which will be re-sterilized during the reheating and melting of the cheese and amalgamation of the cheese with the meat.

I claim:

1. The method of preparing a meat-cheese loaf which comprises surrounding a block or loaf of meat with a thin layer of cheese covered on the outside with tin-foil, and heating the resulting loaf to insure amalgamation or adherence of the cheese and meat.

2. The method of preparing a meat-cheese loaf which comprises surrounding a block or loaf of meat with slabs of cheese, enclosing the loaf in tin-foil, and heating the loaf to melt the cheese and amalgamate the cheese with the meat.

3. The method of preparing a meat-cheese loaf which comprises surrounding a block or loaf of meat with a thin layer of cheese and heating the resulting loaf to insure amalgamation or adherence of the cheese and meat.

4. The method of preparing a meat cheese loaf which comprises surrounding a block or loaf of meat with slabs of cheese and heating the loaf to melt the cheese and amalgamate the cheese with the meat.

In testimony whereof I affix my signature.

CLINTON HENRY PARSONS.